United States Patent
Mikura et al.

(10) Patent No.: US 11,376,476 B2
(45) Date of Patent: Jul. 5, 2022

(54) GOLF BALL

(71) Applicant: Dunlop Sports Co. Ltd., Kobe (JP)

(72) Inventors: Chiemi Mikura, Kobe (JP); Kazuyoshi Shiga, Kobe (JP); Hikaru Nagakura, Kobe (JP); Ryota Sakamine, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 394 days.

(21) Appl. No.: 15/782,577

(22) Filed: Oct. 12, 2017

(65) Prior Publication Data
US 2018/0117421 A1    May 3, 2018

(30) Foreign Application Priority Data
Oct. 31, 2016    (JP) .............................. JP2016-213479

(51) Int. Cl.
*A63B 37/04*    (2006.01)
*A63B 37/00*    (2006.01)
(Continued)

(52) U.S. Cl.
CPC ........ *A63B 37/0074* (2013.01); *A63B 37/003* (2013.01); *A63B 37/0031* (2013.01);
(Continued)

(58) Field of Classification Search
CPC ................................................. A63B 37/0074
See application file for complete search history.

(56) References Cited

U.S. PATENT DOCUMENTS 5,697,856 A * 12/1997 Moriyama ......... A63B 37/0003
                                                       473/374
5,776,012 A * 7/1998 Moriyama ......... A63B 37/0003
                                                       473/372
(Continued)

FOREIGN PATENT DOCUMENTS

| JP | 2011-217857 A | 11/2011 |
| JP | 2013-230365 A | 11/2013 |
| JP | 2015-77405 A | 4/2015 |

OTHER PUBLICATIONS

Dupont, Hardness Conversion, uploaded Nov. 2, 2018, DuPont, 1 page.*
(Continued)

*Primary Examiner* — Eugene L Kim
*Assistant Examiner* — Matthew B Stanczak
(74) *Attorney, Agent, or Firm* — Birch, Stewart, Kolasch & Birch, LLP

(57) ABSTRACT

An object of the present invention is to provide a golf ball having an excellent flight performance on driver shots. The present invention provides a golf ball comprising a spherical core and at least one cover covering the spherical core, wherein a hardness difference D1 (H75–H0) between a hardness H75 at a point radially located at a distance of 75% from a center of the spherical core and a center hardness H0 of the spherical core is 10 or more and 27 or less in Shore C hardness, and a hardness difference D2 (Hs–H75) between a surface hardness Hs of the spherical core and the hardness H75 at the point radially located at the distance of 75% from the center of the spherical core is 0 or more and 6.5 or less in Shore C hardness.

21 Claims, 1 Drawing Sheet

(51) Int. Cl.
  *C08K 5/00* (2006.01)
  *C08K 5/098* (2006.01)
  *C08K 5/09* (2006.01)
  *C08K 5/14* (2006.01)

(52) U.S. Cl.
  CPC ...... *A63B 37/0051* (2013.01); *A63B 37/0063* (2013.01); *A63B 37/0096* (2013.01); *C08K 5/0025* (2013.01); *C08K 5/09* (2013.01); *C08K 5/098* (2013.01); *C08K 5/14* (2013.01); *C08K 2201/014* (2013.01)

(56) References Cited

U.S. PATENT DOCUMENTS

| | | | |
|---|---|---|---|
| 2011/0250991 | A1 | 10/2011 | Isogawa et al. |
| 2013/0296072 | A1 | 11/2013 | Nakajima et al. |
| 2014/0295994 | A1* | 10/2014 | Shindo ............... A63B 37/0064 473/372 |
| 2014/0357407 | A1* | 12/2014 | Shindo ................... C08L 75/08 473/372 |
| 2014/0357408 | A1* | 12/2014 | Shindo ............... A63B 37/0074 473/372 |

OTHER PUBLICATIONS

Rick White, Hardness Conversion, uploaded Nov. 2, 2018, Thermal Tech Equipment, 1 page.*
Examiner's Calculations, uploaded Nov. 2, 2018, Excel Spreadsheet, 1 page.*

* cited by examiner

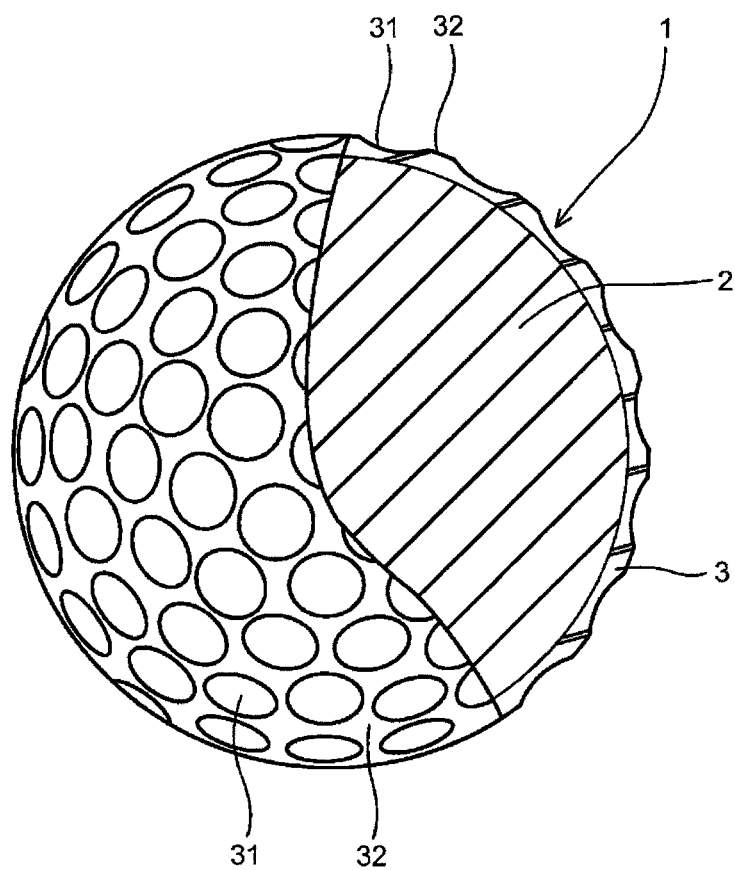

GOLF BALL

FIELD OF THE INVENTION

The present invention relates to a golf ball having an excellent flight performance, more specifically, relates to an improvement of a core of a golf ball.

DESCRIPTION OF THE RELATED ART

As a method for increasing a flight distance of a golf ball on driver shots, for example, there are a method of using a core having a high resilience and a method of using a core having a hardness distribution in which the hardness increases from the core center toward the core surface. The former method has an effect of enhancing a golf ball initial speed, and the latter method has an effect of a higher launch angle and a lower spin rate. A golf ball having a higher launch angle and a lower spin rate travels a greater flight distance.

In order to increase the flight distance of a golf ball, various studies focusing on the hardness distribution of a core have been carried out. For example, Japanese Patent Publication No. 2011-217857 A discloses a golf ball, wherein a difference between a JIS-C hardness H (5.0) at a point located at a distance of 5 mm from a central point of the core and a JIS-C hardness Ho at the central point of the core is 6.0 or more, a difference between a JIS-C hardness H (12.5) at a point located at a distance of 12.5 mm from the central point of the core and the JIS-C hardness H (5.0) is 4.0 or less, a difference between a JIS-C hardness HS at a surface of the core and the JIS-C hardness H (12.5) is 10.0 or more, a difference between the hardness HS and the hardness Ho is 22.0 or more, and there is no zone in which a hardness decreases from the central point toward the surface.

Japanese Patent Publication No. 2013-230365 A discloses a golf ball comprising a core and at least one cover layer, wherein (1) H-14<70, (2) H-8≤72, (3) H-6<75 and (4) H-4-H-8>8 are satisfied when a JIS-C hardness at a position of 14 mm inward from a surface of the core toward a center of the core is adopted as (H-14), a JIS-C hardness at a position of 8 mm inward from a surface of the core toward a center of the core is adopted as (H-8), a JIS-C hardness at a position of 6 mm inward from a surface of the core toward a center of the core is adopted as (H-6), and a JIS-C hardness at a position of 4 mm inward from a surface of the core toward a center of the core is adopted as (H-4) in a cross-sectional hardness of the core.

Japanese Patent Publication No. 2015-77405 A discloses a golf ball comprising a core and at least one cover layer, wherein (1) D-C≥7, (2) C-B≤7, (3) (D-C)−(C-B)≥7 and (4) E-A≥16 are satisfied when a radius of the core is adopted as R (mm), a JIS-C hardness at a centeral point of the core is adopted as A, a JIS-C hardness at a position having a distance of R/3 mm from the central point of the core is adopted as B, a JIS-C hardness at a position having a distance of R/1.8 mm from the central point of the core is adopted as C, a JIS-C hardness at a position having a distance of R/1.3 mm from the central point of the core is adopted as D, and a JIS-C hardness at a surface of the core is adopted as E in a cross-sectional hardness of the core.

SUMMARY OF THE INVENTION

An object of the present invention is to provide a golf ball having an excellent flight performance.

The present invention provides a golf ball comprising a spherical core and at least one cover covering the spherical core, wherein a hardness difference D1 (H75-H0) between a hardness H75 at a point located at a distance of 75% of a radius from a center of the spherical core and a center hardness H0 of the spherical core is 10 or more and 27 or less in Shore C hardness, and a hardness difference D2 (Hs-H75) between a surface hardness Hs of the spherical core and the hardness H75 at the point located at the distance of 75% of the radius from the center of the spherical core is 0 or more and 6.5 or less in Shore C hardness. The present invention provides a golf ball having a high resilience by constructing the golf ball as described above.

The present invention provides a golf ball having an excellent flight performance.

BRIEF DESCRIPTION OF THE DRAWINGS

The FIGURE is a partially cutaway sectional view showing a golf ball according to an embodiment of the present invention.

DESCRIPTION OF THE PREFERRED EMBODIMENT

The present invention provides a golf ball comprising a spherical core and at least one cover covering the spherical core, wherein a hardness difference D1 (H75-H0) between a hardness H75 at a point located at a distance of 75% of a core radius from a center of the spherical core and a center hardness H0 of the spherical core is 10 or more and 27 or less in Shore C hardness, and a hardness difference D2 (Hs-H75) between a surface hardness Hs of the spherical core and the hardness H75 at the point located at the distance of 75% of the core radius from the center of the spherical core is 0 or more and 6.5 or less in Shore C hardness.

The hardness difference D1 (H75-H0) between the hardness H75 at the point located at the distance of 75% of a core radius from the center of the spherical core and the center hardness H0 of the spherical core is preferably 10 or more, more preferably 12 or more, and even more preferably 14 or more in Shore C hardness, and is preferably 27 or less, more preferably 26 or less, and even more preferably 25 or less in Shore C hardness. If the hardness difference D1 falls within the above range, the spherical core becomes an outer-hard inner-soft construction as a whole. A golf ball comprising the spherical core having an outer-hard inner-soft construction has a low spin rate under a high launch angle, and the golf ball having a low spin rate under a high launch angle travels a great flight distance.

The hardness difference D2 (Hs-H75) between the surface hardness Hs of the spherical core and the hardness H75 at the point located at the distance of 75% of the core radius from the center of the spherical core is preferably 0 or more, more preferably 0.5 or more, and even more preferably 1.0 or more in Shore C hardness, and is preferably 6.5 or less, more preferably 6.0 or less, and even more preferably 5.5 or less in Shore C hardness. If the hardness difference D2 falls within the above range, the spherical core has a larger coefficient of restitution. A golf ball having a high coefficient of restitution travels a great flight distance.

A hardness difference D3 (H25-H0) between a hardness H25 at a point located at a distance of 25% of the radius from the center of the spherical core and the center hardness H0 of the spherical core is preferably 7 or more, more preferably 7.5 or more, and even more preferably 8.0 or more in Shore C hardness, and is preferably 15.0 or less, more preferably 14.0 or less, and even more preferably 13.0 or less in Shore C hardness.

A hardness difference D4 (H50-H25) between a hardness H50 at a point located at a distance of 50% of the radius from the center of the spherical core and the hardness H25 at the point located at the distance of 25% of the radius from the center of the spherical core is preferably −3 or more, more preferably −2.0 or more, and even more preferably −1.0 or more in Shore C hardness, and is preferably 3 or less, more preferably 2.5 or less, and even more preferably 2.0 or less in Shore C hardness.

A hardness difference D5 (H75-H50) between the hardness H75 at the point located at the distance of 75% of the radius from the center of the spherical core and the hardness H50 at the point located at the distance of 50% of the radius from the center of the spherical core is preferably 6 or more, more preferably 7 or more, and even more preferably 8 or more in Shore C hardness, and is preferably 13 or less, more preferably 12 or less, and even more preferably 11 or less in Shore C hardness.

A ratio (D2/D1) of the hardness difference D2 (Hs-H75) between the surface hardness Hs of the spherical core and the hardness H75 at the point located at the distance of 75% of the radius from the center of the spherical core to the hardness difference D1 (H75-H0) between the hardness H75 at the point located at the distance of 75% of the radius from the center of the spherical core and the center hardness H0 of the spherical core is preferably 0.3 or less, more preferably 0.25 or less, and is preferably 0 or more, more preferably 0.05 or more. If the ratio (D2/D1) of hardness difference falls within the above range, the spherical core becomes an outer-hard inner-soft construction as well as a construction with a high coefficient of restitution.

The spherical core of the golf ball according to the present invention is preferably formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) an unsaturated fatty acid and/or a metal salt thereof excluding an α,β-unsaturated carboxylic acid having 3 to 8 carbon atoms and/or a metal salt thereof.

[(a) Base Rubber]

As (a) the base rubber, a natural rubber and/or a synthetic rubber may be used. For example, polybutadiene rubber, natural rubber, polyisoprene rubber, styrene polybutadiene rubber, ethylene-propylene-diene rubber (EPDM), or the like may be used. These rubbers may be used solely or in combination of at least two of them. Among them, typically preferred is a high-cis polybutadiene having a cis-1,4 bond in a proportion of 40 mass % or more, preferably 80 mass % or more, and more preferably 90 mass % or more in view of its superior resilience property.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferred.

The high-cis polybutadiene preferably has a Mooney viscosity ($ML_{1+4}$ (100° C.)) of 30 or more, more preferably 32 or more, and even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of preheating time: 1 minute, rotor rotation time: 4 minutes, and temperature: 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability may deteriorate, and if the molecular weight distribution (Mw/Mn) of the high-cis polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

[(b) Co-crosslinking Agent]

(b) The α,β-unsaturated carboxylic acid having 3 to 8 carbon atoms and/or the metal salt thereof is blended as a co-crosslinking agent in the rubber composition, and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition further contains (f) a metal compound as an essential component. This is because neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms as the co-crosslinking agent. Further, in case of using the α,β-unsaturated carboxylic acid having 3 to 8 carbon atoms and the metal salt thereof in combination as the co-crosslinking agent, (f) the metal compound may be used as an optional component.

Examples of the α,β-unsaturated carboxylic acid having 3 to 8 carbon atoms include acrylic acid, methacrylic acid, fumaric acid, maleic acid, crotonic acid, and the like.

Examples of the metal constituting the metal salt of the α,β-unsaturated carboxylic acid having 3 to 8 carbon atoms include a monovalent metal ion such as sodium, potassium, lithium or the like; a divalent metal ion such as magnesium, calcium, zinc, barium, cadmium or the like; a trivalent metal ion such as aluminum or the like; and other metal ions such as tin, zirconium or the like. The metal component may be used solely or as a mixture of at least two of them. Among them, as the metal component, the divalent metal such as magnesium, calcium, zinc, barium, cadmium or the like is preferred. This is because use of the divalent metal salt of the α,β-unsaturated carboxylic acid having 3 to 8 carbon atoms easily generates a metal crosslinking between the rubber molecules. Especially, as the divalent metal salt, zinc acrylate is preferred, because zinc acrylate enhances the resilience of the resultant golf ball. The α,β-unsaturated carboxylic acid having 3 to 8 carbon atoms and/or the metal salt thereof may be used solely or in combination at least two of them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (c) the crosslinking initiator which will be explained below must be increased in order to obtain an appropriate hardness of the constituting member formed from the rubber composition, which tends to lower the resilience of the golf ball. On the other hand, if the amount of the α,β-unsaturated carboxylic acid having 3 to 8 carbon atoms and/or the metal salt thereof exceeds 50 parts by mass, the constituting member formed from the rubber composition becomes so hard that the shot feeling of the golf ball may be lowered.

[(c) Crosslinking Initiator]

(c) The crosslinking initiator is blended in order to crosslink (a) the base rubber component. As (c) the crosslinking initiator, an organic peroxide is preferred. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)hexane, di-t-butylperoxide or the like. These organic peroxides may be used solely or in combination at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of (c) the crosslinking initiator is less than 0.2 part by mass, the constituting member formed from the rubber composition becomes so soft that the resilience of the golf ball may be lowered. If the amount of (c) the crosslinking initiator exceeds 5.0 parts by mass, the amount of (b) the co-crosslinking agent which has been explained above must be decreased in order to obtain an appropriate hardness of the constituting member formed from the rubber composition, which may lower the resilience of the golf ball or worsen the durability of the golf ball.

[(d) Unsaturated Fatty Acid and/or Metal Salt Thereof]

(d) The unsaturated fatty acid and/or the metal salt thereof is an aliphatic monocarboxylic acid having at least one unsaturated bond in the hydrocarbon chain and/or a metal salt thereof. The hydrocarbon chain optionally has a substituent substituting a hydrogen atom of the hydrocarbon chain. It is noted that (d) the unsaturated fatty acid and/or the metal salt thereof excludes (b) the α,β-unsaturated carboxylic acid having 3 to 8 carbon atoms and/or the metal salt thereof used as the co-crosslinking agent.

(d) The unsaturated fatty acid and/or the metal salt thereof preferably has 4 or more carbon atoms, more preferably 5 or more carbon atoms, even more preferably 8 or more carbon atoms, and most preferably 12 or more carbon atoms, and preferably has 33 or less carbon atoms, more preferably 30 or less carbon atoms, and even more preferably 26 or less carbon atoms. If the component (d) is an unsaturated fatty acid having 33 or less carbon atoms and/or a metal salt thereof, the addition reaction between the component (d) and the component (b) occurs more easily, and thus the obtained spherical core has a higher resilience.

In the case that (d) the unsaturated fatty acid and/or the metal salt thereof is an unsaturated fatty acid having 5 or more carbon atoms and/or a metal salt thereof, (d) the unsaturated fatty acid and/or the metal salt thereof preferably has the first carbon-carbon double bond at the first or later carbon, more preferably at the second or later carbon, even more preferably at the third or later carbon, and most preferably at the fourth or later carbon, counted from the carboxyl group side thereof. If the component (d) is an unsaturated fatty acid having the first carbon-carbon double bond at the carbon in the above range and/or a metal salt thereof, the addition reaction between the component (d) and the component (b) occurs more easily, and thus the obtained spherical core has a higher resilience.

(d) The unsaturated fatty acid and/or the metal salt thereof is preferably an unsaturated fatty acid represented by the chemical formula (1) and/or a metal salt thereof.

[Chemical formula 1]

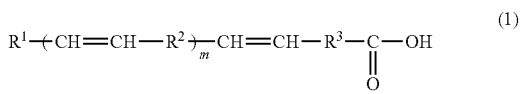

$$R^1 {-\!\!\!\!-} (CH{=\!=}CH{-\!\!\!\!-}R^2)_m {-\!\!\!\!-} CH{=\!=}CH{-\!\!\!\!-}R^3{-\!\!\!\!-}\underset{\underset{O}{\|}}{C}{-\!\!\!\!-}OH \quad (1)$$

In the chemical formula (1), $R^1$ represents a hydrogen atom or an alkyl group having 1 to 25 carbon atoms and optionally having a substituent, $R^2$ represents an alkylene group having 1 to 25 carbon atoms and optionally having a substituent, $R^3$ represents an alkylene group having 2 to 25 carbon atoms and optionally having a substituent, and m represents a natural number ranging from 0 to 5, and when m ranges from 2 to 5, multiple $R^2$ may be identical to or different from each other.

The alkyl group having 1 to 25 carbon atoms represented by $R^1$ may have a branched structure or a cyclic structure, but is preferably a linear alkyl group. The alkyl group $R^1$ preferably has 1 or more carbon atoms, more preferably 3 or more carbon atoms, and even more preferably 5 or more carbon atoms, and preferably has 25 or less carbon atoms, more preferably 23 or less carbon atoms, and even more preferably 21 or less carbon atoms. Examples of the optional functional group of the alkyl group having 1 to 25 carbon atoms represented by $R^1$ include a hydroxy group, aldehyde group, and ketone group.

The alkylene group having 1 to 25 carbon atoms represented by $R^2$ may have a branched structure or a cyclic structure, but is preferably a linear alkylene group. The alkylene group $R^2$ preferably has 1 or more carbon atoms, more preferably 3 or more carbon atoms, and even more preferably 5 or more carbon atoms, and preferably has 25 or less carbon atoms, more preferably 23 or less carbon atoms, and even more preferably 21 or less carbon atoms. Examples of the optional functional group of the alkylene group having 1 to 25 carbon atoms represented by $R^2$ include a hydroxy group, aldehyde group, and ketone group.

The alkylene group having 2 to 25 carbon atoms represented by $R^3$ may have a branched structure or a cyclic structure, but is preferably a linear alkylene group. The alkylene group $R^3$ preferably has 2 or more carbon atoms, more preferably 3 or more carbon atoms, and even more preferably 4 or more carbon atoms, and preferably has 25 or less carbon atoms, more preferably 23 or less carbon atoms, and even more preferably 21 or less carbon atoms. Examples of the optional functional group of the alkylene group having 2 to 25 carbon atoms represented by $R^3$ include a hydroxy group, aldehyde group, and ketone group.

The above m is preferably 3 or less, more preferably 2 or less, even more preferably 1 or less, and most preferably 0.

As the compound represented by the chemical formula (1), a compound represented by the following chemical formula (2) or chemical formula (3) is more preferred.

[Chemical formula 2]

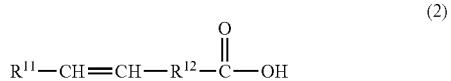

(2)

In the chemical formula (2), $R^{11}$ represents a hydrogen atom or an alkyl group having 1 to 25 carbon atoms and optionally having a substituent, and $R^{12}$ represents an alkylene group having 2 to 25 carbon atoms and optionally having a substituent.

The alkyl group having 1 to 25 carbon atoms represented by $R^{11}$ may have a branched structure or a cyclic structure, but is preferably a linear alkyl group. Examples of the optional functional group of the alkyl group having 1 to 25 carbon atoms represented by $R^{11}$ include a hydroxy group, aldehyde group, and ketone group. The alkylene group having 2 to 25 carbon atoms represented by $R^{12}$ may have a branched structure or a cyclic structure, but is preferably a linear alkylene group. Examples of the optional functional group of the alkylene group having 2 to 25 carbon atoms represented by $R^{12}$ include a hydroxy group, aldehyde group, and ketone group.

In the chemical formula (2), in the case that $R^{11}$ is an alkyl group, a ratio ($R^{11}/R^{12}$) of carbon atom number in $R^{11}$ to carbon atom number in $R^{12}$ is preferably 0.1 or more, more preferably 0.5 or more, and even more preferably 0.8 or more, and is preferably 10.0 or less, more preferably 5.0 or less, and even more preferably 1.3 or less. If the ratio ($R^{11}/R^{12}$) of carbon atom number falls within the above range, the obtained spherical core has a higher resilience.

[Chemical formula 3]

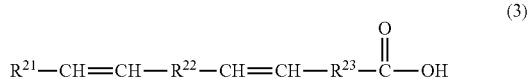

(3)

In the chemical formula (3), $R^{21}$ represents a hydrogen atom or an alkyl group having 1 to 25 carbon atoms and optionally having a substituent, $R^{22}$ represents an alkylene group having 1 to 25 carbon atoms and optionally having a substituent, and $R^{23}$ represents an alkylene group having 2 to 25 carbon atoms and optionally having a substituent.

The alkyl group having 1 to 25 carbon atoms represented by $R^{21}$ may have a branched structure or a cyclic structure, but is preferably a linear alkyl group. Examples of the optional functional group of the alkyl group having 1 to 25 carbon atoms represented by $R^{21}$ include a hydroxy group, aldehyde group, and ketone group. The alkylene group having 1 to 25 carbon atoms represented by $R^{22}$ may have a branched structure or a cyclic structure, but is preferably a linear alkylene group. Examples of the optional functional group of alkylene group having 1 to 25 carbon atoms represented by $R^{22}$ include a hydroxy group, aldehyde group, and ketone group. The alkylene group having 2 to 25 carbon atoms represented by $R^{23}$ may have a branched structure or a cyclic structure, but is preferably a linear alkylene group. Examples of the optional functional group of the alkylene group having 2 to 25 carbon atoms represented by $R^{23}$ include a hydroxy group, aldehyde group, and ketone group.

The alkylene group represented by $R^{22}$ preferably has 25 or less carbon atoms, more preferably 20 or less carbon atoms, and even more preferably 15 or less carbon atoms. As the alkylene group represented by $R^{22}$, methylene and ethylene are preferred, methylene is more preferred.

In the chemical formula (3), in the case that $R^{21}$ is an alkyl group, a ratio ($R^{21}/R^{23}$) of carbon atom number in $R^{21}$ to carbon atom number in $R^{23}$ is preferably 0.1 or more, more preferably 0.5 or more, and even more preferably 0.8 or more, and is preferably 10.0 or less, more preferably 5.0 or less, and even more preferably 1.3 or less. If the ratio ($R^{21}/R^{23}$) of carbon atom number falls within the above range, the addition reaction between the component (d) and the component (b) effectively occurs, and thus the obtained spherical core has a higher resilience.

(d) The unsaturated fatty acid and/or the metal salt thereof is preferably a linear unsaturated fatty acid and/or a metal salt thereof. Examples of (d) the unsaturated fatty acid and/or the metal salt thereof include an unsaturated fatty acid having a carbon-carbon double bond at the terminal of the hydrocarbon chain and/or a metal salt thereof, an unsaturated fatty acid having at least one trans-isomerized carbon-carbon double bond and/or a metal salt thereof, and an unsaturated fatty acid having at least one cis-isomerized carbon-carbon double bond and/or a metal salt thereof. As (d) the unsaturated fatty acid and/or the metal salt thereof, the unsaturated fatty acid having at least one cis-isomerized carbon-carbon double bond and/or the metal salt thereof is more preferred. If the component (d) has the above structure, the reactivity of the addition reaction between the component (d) and the component (b) is high, and thus the obtained spherical core has a higher resilience.

Specific examples of the unsaturated fatty acid constituting (d) the unsaturated fatty acid and/or the metal salt thereof include an unsaturated fatty acid having a double bond at the terminal thereof, such as 4-pentenoic acid (C5, monounsaturated fatty acid, (4)), 5-hexenoic acid (C6, monounsaturated fatty acid, (5)), 6-heptenoic acid (C7, monounsaturated fatty acid, (6)), 7-octenoic acid (C8, monounsaturated fatty acid, (7)), 8-nonenoic acid (C9, monounsaturated fatty acid, (8)), 9-decenoic acid (C10, monounsaturated fatty acid, (9)), and 10-undecylenic acid (C11, monounsaturated fatty acid, (10)); and an unsaturated fatty acid having a double bond at a location other than the terminal thereof, such as myristoleic acid (C14, cis-9-monounsaturated fatty acid, (9)), palmitoleic acid (C16, cis-9-monounsaturated fatty acid, (9)), stearidonic acid (C18, 6,9,12,15-tetraunsaturated fatty acid, (6)), vaccenic acid (C18, cis-11-monounsaturated fatty acid, (11)), oleic acid (C18, cis-9-monounsaturated fatty acid, (9)), ricinoleic acid (C18, 12-hydroxy-cis-9-monounsaturated fatty acid), elaidic acid (C18, trans-9-monounsaturated fatty acid, (9)), linoleic acid (C18, cis-9-cis-12-diunsaturated fatty acid, (9)), α-linolenic acid (C18, 9,12,15-triunsaturated fatty acid, (9)), γ-linolenic acid (C18, 6,9,12-triunsaturated fatty acid, (6)), gadoleic acid (C20, cis-9-monounsaturated fatty acid, (9)), eicosenoic acid (C20, cis-11-monounsaturated fatty acid, (11)), eicosadienoic acid (C20, cis-11-cis-14-diunsaturated fatty acid, (11)), arachidonic acid (C20, 5,8,11,14-tetraunsaturated fatty acid, (5)), eicosapentaenoic acid (C20, 5,8,11,14,17-pentaunsaturated fatty acid, (5)), erucic acid (C22, cis-13-monounsaturated fatty acid, (13)), docosahexaenoic acid (C22, 4,7,10,13,16, 19-hexaunsaturated fatty acid, (4)), and nervonic acid (C24, cis-15-monounsaturated fatty acid, (15)); and the like. It is noted that (10) or the like described in the parentheses after the compound names indicates the carbon position where the first carbon-carbon double bond is located, counted from the carboxyl group side of the unsaturated fatty acid.

Among them, preferable examples of the unsaturated fatty acid constituting (d) the unsaturated fatty acid and/or the metal salt thereof include 10-undecylenic acid, myristoleic acid, palmitoleic acid, oleic acid, linoleic acid, eicosenoic acid, erucic acid, and nervonic acid.

Examples of the metal constituting (d) the unsaturated fatty acid and/or the metal salt thereof include a monovalent metal ion such as sodium, potassium, lithium or the like; a divalent metal ion such as magnesium, calcium, zinc, barium, cadmium or the like; a trivalent metal ion such as aluminum or the like; and other metal ions such as tin, zirconium or the like. The metal component may be used solely or as a mixture of at least two of them. Among them, as the metal component, the divalent metal such as magnesium, calcium, zinc, barium, cadmium or the like is preferred, zinc is particularly preferred.

The amount of (d) the unsaturated fatty acid and/or the metal salt thereof is preferably 1 part by mass or more, more preferably 2 parts by mass or more, and even more preferably 3 parts by mass or more, and is preferably 35 parts by mass or less, more preferably 30 parts by mass or less, even more preferably 25 parts by mass or less, particularly preferably 20 parts by mass or less, and most preferably 17 parts by mass or less, with respect to 100 parts by mass of (a) the base rubber. If the amount of the component (d) is 1 part by mass or more, the effect of adding the component (d) is fully exerted, and thus the obtained spherical core has a higher resilience. If the amount of the component (d) is 35 parts by mass or less, the spherical core does not become excessively soft, and thus the durability and high resilience of the golf ball do not deteriorate.

A ratio (component (d)/component (b)) of a total of mole numbers of carboxyl groups (—COOH) and carboxylate groups (—COO⁻) in the component (d) to a total of mole numbers of carboxyl groups and carboxylate groups in the component (b) is preferably 0.01 or more, more preferably 0.02 or more, and even more preferably 0.03 or more, and is preferably 0.25 or less, more preferably 0.20 or less, and even more preferably 0.18 or less.

[(e) Saturated Fatty Acid and/or Metal Salt Thereof]

The rubber composition may further contain (e) a saturated fatty acid and/or a metal salt thereof. If (e) the saturated fatty acid and/or the metal salt thereof is contained, the dispersibility of the each material in the rubber composition becomes better. Examples of the fatty acid component constituting (e) the saturated fatty acid and/or the metal salt thereof include, but are not limited to, a linear saturated fatty acid and a branched saturated fatty acid. (e) The saturated fatty acid and/or the metal salt thereof may be used solely or in combination of at least two of them.

The fatty acid component constituting (e) the saturated fatty acid and/or the metal salt thereof preferably has 4 or more carbon atoms, more preferably 12 or more carbon atoms, and even more preferably 16 or more carbon atoms, and preferably has 30 or less carbon atoms, more preferably 28 or less carbon atoms, and even more preferably 26 or less carbon atoms.

Examples of the saturated fatty acid include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, henicosanoic acid, docosanoic acid, tricosanoic acid, tetracosanoic acid, pentacosanoic acid, hexacosanoic acid, heptacosanoic acid, octacosanoic acid, nonacosanoic acid, and triacontanoic acid.

Examples of the cation component of the saturated fatty acid metal salt include a monovalent metal ion such as sodium, potassium, lithium, silver or the like; a divalent metal ion such as magnesium, calcium, zinc, barium, cadmium, copper, cobalt, nickel, manganese or the like; a trivalent metal ion such as aluminum, iron or the like; and other metal ions such as tin, zirconium, titanium or the like. The cation component may be used solely or as a mixture of at least two of them.

The amount of (e) the saturated fatty acid and/or the metal salt thereof is preferably 0.5 part by mass or more, more preferably 1.0 part by mass or more, and even more preferably 1.5 parts by mass or more, and is preferably 5.0 parts by mass or less, more preferably 4.5 parts by mass or less, and even more preferably 3.5 parts by mass or less, with respect to 100 parts by mass of (a) the base rubber. If the amount of (e) the saturated fatty acid and/or the metal salt thereof is 0.5 part by mass or more, the dispersibility of the each material in the rubber composition becomes better, and if the amount of (e) the saturated fatty acid and/or the metal salt thereof is 5.0 parts by mass or less, the change of the rubber composition in physical properties caused by containing (e) the saturated fatty acid and/or the metal salt thereof can be suppressed.

[(f) Metal Compound]

In the case that the rubber composition used in the present invention contains only the α,β-unsaturated carboxylic acid having 3 to 8 carbon atoms as the co-crosslinking agent, the rubber composition further contains (f) a metal compound as an essential component. (f) The metal compound is not particularly limited as long as it can neutralize (b) the α,β-unsaturated carboxylic acid having 3 to 8 carbon atoms in the rubber composition. (f) The metal compound includes, for example, a metal hydroxide such as magnesium hydroxide, zinc hydroxide, calcium hydroxide, sodium hydroxide, lithium hydroxide, potassium hydroxide, copper hydroxide, or the like; a metal oxide such as magnesium oxide, calcium oxide, zinc oxide, copper oxide, or the like; and a metal carbonate such as magnesium carbonate, zinc carbonate, calcium carbonate, sodium carbonate, lithium carbonate, potassium carbonate, or the like. (f) The metal compound is preferably a divalent metal compound, more preferably a zinc compound. This is because the divalent metal compound reacts with the α,β-unsaturated carboxylic acid having 3 to 8 carbon atoms, thereby forming a metal crosslinking. Further, use of the zinc compound provides a golf ball with a higher resilience. (f) The metal compound may be used solely or as a mixture of at least two of them. The amount of (f) the metal compound may be appropriately determined in accordance with the desired neutralization degree of (b) the α,β-unsaturated carboxylic acid having 3 to 8 carbon atoms and (d) the unsaturated fatty acid.

The carboxyl group of the rubber composition preferably has a neutralization degree of 100 mole % or more, more preferably 105 mole % or more, even more preferably 108 mole % or more, and most preferably 110 mole % or more, and preferably has a neutralization degree of 300 mole % or less, more preferably 270 mole % or less, even more preferably 250 mole % or less, and most preferably 200 mole % or less. If the neutralization degree is 100 mole % or more, the durability of the golf ball is maintained without changing the compression deformation amount of the core. On the other hand, if the neutralization degree is 300 mole % or less, the obtained spherical core does not become excessively soft, and thus the high resilience of the golf ball does not deteriorate. It is noted that the neutralization degree of the carboxyl group of the rubber composition is defined by the following mathematical formula.

Neutralization degree (mole %)=100 ×[Σ(mole number of cation component×valence of cation component)]/[Σ(mole number of anion component×valence of anion component)]  [Mathematical Formula 1]

In the mathematical formula 1, Σ(mole number of cation component×valence of cation component) is a sum of a product obtained by multiplying the mole number of the metal ion by the valence of the metal ion in the component (b), a product obtained by multiplying the mole number of the metal ion by the valence of the metal ion in the component (d), and a product obtained by multiplying the mole number of the metal ion by the valence of the metal ion in the component (f). It is noted that, when the rubber composition further contains the component (e), Σ(mole number of cation component×valence of cation component) further includes a product obtained by multiplying the mole number of the metal ion by the valence of the metal ion in the component (e).

In the mathematical formula 1, Σ(mole number of anion component×valence of anion component) is a sum of the mole number of the carboxyl group in the component (b) and the mole number of the carboxyl group in the component (d). It is noted that, when the rubber composition further contains the component (e), Σ(mole number of anion component×valence of anion component) further includes the mole number of the carboxyl group in the component (e).

[(g) Organic Sulfur Compound]

The rubber composition used in the present invention preferably contains (g) an organic sulfur compound. If the rubber composition contains (g) the organic sulfur compound, the spherical core has a higher resilience.

(g) The organic sulfur compound is not particularly limited, as long as it is an organic compound having a sulfur atom in the molecule thereof. Examples of (g) the organic sulfur compound include an organic compound having a thiol group (—SH) or a polysulfide bond having 2 to 4 sulfur atoms (—S—S—, —S—S—S—, or —S—S—S—S—), and a metal salt thereof (—SM, —S—M—S—, —S—M—S—S—, —S—S—M—S—S—, —S—M—S—S—S—, or the like; M is a metal atom). Examples of the metal salt include a monovalent metal salt such as sodium, lithium, potassium, copper (I), and silver (I) or the like; and a divalent metal salt such as zinc, magnesium, calcium, strontium, barium, titanium (II), manganese (II), iron (II), cobalt (II), nickel (II), zirconium (II), tin (II) or the like. Furthermore, (g) the organic sulfur compound may be any one of an aliphatic compound (aliphatic thiol, aliphatic thiocarboxylic acid, aliphatic dithiocarboxylic acid, aliphatic polysulfide, or the like), heterocyclic compound, alicyclic compound (alicyclic thiol, alicyclic thiocarboxylic acid, alicyclic dithiocarboxylic acid, alicyclic polysulfide, or the like), and aromatic compound.

(g) The organic sulfur compound, for example, includes thiols (thiophenols and thionaphthols), polysulfides, thiurams, thiocarboxylic acids, dithiocarboxylic acids, sulfenamides, dithiocarbamates, and thiazoles.

Examples of the thiols include, for example, thiophenols and thionaphthols. The thiophenols include, for example, thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol and the like; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, pentabromothiophenol and the like; thiophenols substituted with an iodo group, such as 4-iodothiophenol, 2,4-diiodothiophenol, 2,5-diiodothiophenol, 2,6-diiodothiophenol, 2,4,5-triiodothiophenol, 2,4,5,6-tetraiodothiophenol, pentaiodothiophenol and the like; or a metal salt thereof. As the metal salt, a zinc salt is preferred.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. Preferable examples include 2-thionaphthol, 1-thionaphthol, and a metal salt thereof. The metal salt is preferably a divalent metal salt, more preferably a zinc salt. Specific examples of the metal salt include, for example, the zinc salt of 1-thionaphthol and the zinc salt of 2-thionaphthol.

The polysulfides are organic sulfur compounds having a polysulfide bond, and include, for example, disulfides, trisulfides, and tetrasulfides. The polysulfides preferably include diphenylpolysulfides.

Examples of the diphenylpolysulfides include diphenyldisulfide; diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,6-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,6-diiodophenyl)disulfide, bis(2,4,5-triiodophenyl)disulfide, bis(2,4,5,6-tetraiodophenyl)disulfide, and bis(pentaiodophenyl)disulfide; and diphenyldisulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide; and the like.

The thiurams include, for example, thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. The thiocarboxylic acids include, for example, a naphthalene thiocarboxylic acid. The dithiocarboxylic acids include, for example, a naphthalene dithiocarboxylic acid. The sulfenamides include, for example, N-cyclohexyl-2-benzothiazole sulfenamide, N-oxydiethylene-2-benzothiazole sulfenamide, and N-t-butyl-2-benzothiazole sulfenamide.

(g) The organic sulfur compound preferably includes thiophenols and/or the metal salt thereof, thionaphthols and/or the metal salt thereof, diphenyldisulfides, and thiuramdisulfides, more preferably includes 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl) disulfide, bis(2,6-dichlorophenyl)disulfide, bis(2,6-dibromophenyl)disulfide, bis(2,6-diiodophenyl)disulfide, and bis(pentabromophenyl) disulfide.

(g) The organic sulfur compound may be used solely or in combination of at least two of them.

The amount of (g) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (g) the organic sulfur compound is less than 0.05 part by mass, the effect of adding (g) the organic sulfur compound is not obtained, and thus the resilience of the golf ball may not improve. In addition, if the amount of (g) the organic sulfur compound exceeds 5.0 parts by mass, the obtained golf ball has an excessively large compression deformation amount, and thus the resilience thereof may be lowered.

The rubber composition used in the present invention may further contain additives such as a pigment, a filler for adjusting a weight or the like, an antioxidant, a peptizing agent, a softening agent or the like, where necessary. The pigment blended into the rubber composition, for example, includes a white pigment, a blue pigment, a purple pigment or the like.

As the white pigment, titanium oxide is preferably used. The type of titanium oxide is not particularly limited, but rutile type is preferably used because of the high opacity. In addition, the amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The amount of the blue pigment is preferably 0.001 part by mass or more, more preferably 0.05 part by mass or more, and is preferably 0.2 part by mass or less, more preferably 0.1 part by mass or less, with respect to 100 parts by mass of (a) the base rubber. If the amount of the blue pigment is less than 0.001 part by mass, blueness is insufficient, and the color looks yellowish. If the amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as a final product. The filler may be blended where necessary. The filler includes, for example, an inorganic filler such as zinc oxide, barium sulfate, calcium carbonate, magnesium oxide, tungsten powder, molybdenum powder, or the like.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

The spherical core of the golf ball according to the present invention can be obtained by molding the kneaded rubber composition in a mold. The temperature for molding the spherical core is preferably 150° C.±10° C., and more preferably 150° C.±5° C. If the molding temperature is excessively high, the requirement that the hardness difference D2 (=Hs–H75) is 0 or more and 6.5 or less in Shore C hardness is not satisfied. In addition, if the molding temperature is excessively low, the requirement that the hardness difference D1 (=H75–H0) is 10 or more and 27 or less in Shore C hardness is not satisfied. The molding pressure preferably ranges from 2.9 MPa to 11.8 MPa. The molding time preferably ranges from 10 minutes to 60 minutes.

[Spherical Core]

The spherical core preferably has a diameter of 34.8 mm or more, more preferably 36.8 mm or more, and even more preferably 38.8 mm or more, and preferably has a diameter of 42.2 mm or less, more preferably 41.8 mm or less, even more preferably 41.2 mm or less, and most preferably 40.8 mm or less. If the spherical core has a diameter of 34.8 mm or more, the thickness of the cover does not become too thick and thus the resilience becomes better. On the other hand, if the spherical core has a diameter of 42.2 mm or less, the thickness of the cover does not become too thin and thus the cover functions better.

When the spherical core has a diameter in a range from 34.8 mm to 42.2 mm, the compression deformation amount of the spherical core (shrinking amount of the spherical core along the compression direction) when applying a load from an initial load of 98 N to a final load of 1275 N is preferably 1.90 mm or more, more preferably 2.00 mm or more, and even more preferably 2.10 mm or more, and is preferably 5.00 mm or less, more preferably 4.80 mm or less, and even more preferably 4.60 mm or less. If the compression deformation amount is 1.90 mm or more, the shot feeling of the golf ball becomes better. If the compression deformation amount is 5.00 mm or less, the resilience of the golf ball becomes better.

The spherical core preferably has a structure represented by the chemical formula (4). If the spherical core has a structure represented by the chemical formula (4), the spherical core has a higher resilience. The carboxyl group in the molecule of the structure represented by the chemical formula (4) may be neutralized with a metal ion. In addition, the structure represented by the chemical formula (4) may form a metal crosslinking with other compound via the carboxyl group in the molecule thereof.

[Chemical formula 4]

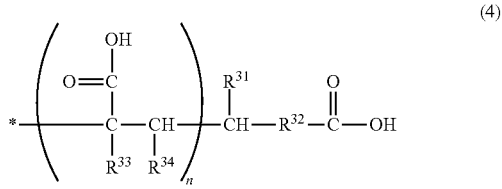

(4)

In the chemical formula (4), $R^{31}$ represents a hydrogen atom or an alkyl group having 1 to 25 carbon atoms and optionally being substituted with a functional group, $R^{32}$ represents an alkylene group having 2 to 25 carbon atoms and optionally being substituted with a functional group, $R^{33}$ represents a hydrogen atom or an alkyl group having 1 to 5 carbon atoms, $R^{34}$ represents a hydrogen atom, a carboxyl group or an alkyl group having 1 to 5 carbon atoms, * represents a location bonding to a carbon atom in (a) the base rubber, n represents a natural number of 1 or more, and when n is 2 or more, multiple $R^{33}$ and $R^{34}$ may be identical to or different from each other.

The alkyl group having 1 to 25 carbon atoms represented by $R^{31}$ may have a branched structure or a cyclic structure, but is preferably a linear alkyl group. Examples of the optional functional group of the alkyl group having 1 to 25 carbon atoms represented by $R^{31}$ include a hydroxy group, aldehyde group, and ketone group. The alkyl group $R^{31}$ preferably has 1 or more carbon atoms, more preferably 3 or more carbon atoms, and even more preferably 5 or more carbon atoms, and preferably has 25 or less carbon atoms, more preferably 23 or less carbon atoms, and even more preferably 21 or less carbon atoms.

The alkylene group having 2 to 25 carbon atoms represented by $R^{32}$ may have a branched structure or a cyclic structure, but is preferably a linear alkylene group. Examples of the optional functional group of the alkylene group having 2 to 25 carbon atoms represented by $R^{32}$ include a hydroxy group, aldehyde group, and ketone group. The alkylene group $R^{32}$ preferably has 2 or more carbon atoms, more preferably 4 or more carbon atoms, and even more preferably 5 or more carbon atoms, and preferably has 25 or less carbon atoms, more preferably 23 or less carbon atoms, and even more preferably 21 or less carbon atoms.

The alkyl group having 1 to 5 carbon atoms represented by $R^{33}$ may have a branched structure or a cyclic structure, but is preferably a linear alkyl group. The alkyl group $R^{33}$ preferably has 1 or more carbon atoms, more preferably 2 or more carbon atoms, and even more preferably 3 or more carbon atoms, and preferably has 5 or less carbon atoms, more preferably 4 or less carbon atoms, and even more preferably 3 or less carbon atoms.

The alkyl group having 1 to 5 carbon atoms represented by $R^{34}$ may have a branched structure or a cyclic structure, but is preferably a linear alkyl group. The alkyl group $R^{34}$ preferably has 1 or more carbon atoms, more preferably 2 or more carbon atoms, even more preferably 3 or more carbon atoms, and preferably has 5 or less carbon atoms, more preferably 4 or less carbon atoms, even more preferably 3 or less carbon atoms.

In the chemical formula (4), a total number of carbon atoms in $R^{33}$ and carbon atoms in $R^{34}$ is preferably 5 or less, more preferably 4 or less, and even more preferably 3 or less.

In the chemical formula (4), in the case that $R^{31}$ is an alkyl group, a total number of carbon atoms in $R^{31}$ and carbon atoms in $R^{32}$ is preferably 8 or more, more preferably 10 or more, and even more preferably 12 or more, and is preferably 28 or less, more preferably 26 or less, and even more preferably 24 or less. If a total number of carbon atoms falls within the above range, the obtained spherical core has a higher resilience.

In addition, in the chemical formula (4), in the case that $R^{31}$ is an alkyl group, a ratio ($R^{31}/R^{32}$) of carbon atom number in $R^{31}$ to carbon atom number in $R^{32}$ is preferably 0.1 or more, more preferably 0.5 or more, and even more preferably 0.8 or more, and is preferably 10.0 or less, more preferably 5.0 or less, and even more preferably 1.3 or less. If the ratio ($R^{31}/R^{32}$) of carbon atom number falls within the above range, the obtained spherical core has a higher resilience.

[Cover]

The cover of the golf ball of the present invention is formed from a cover composition containing a resin component. Examples of the resin component include, for example, an ionomer resin; a thermoplastic polyurethane elastomer having a trade name of "Elastollan (registered trademark)" available from BASF Japan Ltd.; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation; and the like.

The ionomer resin includes, for example, a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion, or a mixture of those. The olefin preferably includes an olefin having 2 to 8 carbon atoms. Examples of the olefin include ethylene, propylene, butene, pentene, hexene, heptene, and octene. The olefin more preferably includes ethylene. Examples of the α,β-unsaturated carboxylic acid having 3 to 8 carbon atoms include acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferred. Among these, the ionomer resin preferably includes a metal ion-neutralized product of a binary copolymer composed of ethylene and (meth)acrylic acid, and a metal ion-neutralized product of a ternary copolymer composed of ethylene, (meth)acrylic acid and (meth)acrylic acid ester.

Specific examples of the ionomer resin include trade name "Himilan (registered trademark) (e.g. the binary copolymerized ionomer resin such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer resin such as Himilan 1856 (Na), Himilan 1855 (Zn))" available from Du Pont-Mitsui Polychemicals Co., Ltd.

Further, examples of the ionomer resin also include "Surlyn (registered trademark) (e.g. the binary copolymerized ionomer resin such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer resin such as Surlyn 8120 (Na), Surlyn 8320 (Na), Surlyn 9320 (Zn), Surlyn 6320 (Mg), HPF 1000 (Mg), HPF 2000 (Mg))" available from E.I. du Pont de Nemours and Company.

Further, examples of the ionomer resin also include "Iotek (registered trademark) (e.g. the binary copolymerized ionomer resin such as Iotek 8000 (Na), Iotek 8030 (Na), Iotek 7010 (Zn), Iotek 7030 (Zn); and the ternary copolymerized ionomer resin such as Iotek 7510 (Zn), Iotek 7520 (Zn))" available from ExxonMobil Chemical Corporation.

It is noted that Na, Zn, Li, Mg or the like described in the parentheses after the trade name of the ionomer resin indicates a metal ion type for neutralizing the ionomer resin. The ionomer resin may be used solely or in combination of at least two of them.

The cover composition constituting the cover of the golf ball of the present invention preferably contains, as a resin component, a thermoplastic polyurethane elastomer or an ionomer resin. In case of using the ionomer resin, it is preferred to use a thermoplastic styrene elastomer together. The amount of the polyurethane or ionomer resin in the resin component of the cover composition is preferably 50 mass % or more, more preferably 60 mass % or more, and even more preferably 70 mass % or more.

In addition to the above resin component, the cover composition may further contain a pigment component such as a white pigment (e.g. titanium oxide), a blue pigment and a red pigment; a weight adjusting agent such as zinc oxide, calcium carbonate and barium sulfate; a dispersant; an antioxidant; an ultraviolet absorber; a light stabilizer; a fluorescent material or a fluorescent brightener; and the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. Further, if the amount of the white pigment exceeds 10 parts by mass, the durability of the obtained cover may deteriorate.

It is preferred that the slab hardness of the cover composition is appropriately set in accordance with the desired performance of the golf ball. For example, in case of a so-called distance golf ball which focuses on a flight distance, the cover composition preferably has a slab hardness of 50 or more, more preferably 55 or more, and even more preferably 60 or more, and preferably has a slab hardness of 80 or less, more preferably 70 or less, and even more preferably 68 or less in Shore D hardness. If the cover composition has a slab hardness of 50 or more, the obtained golf ball has a higher launch angle and lower spin rate on driver shots and iron shots, and thus travels a greater flight distance. Further, if the cover composition has a slab hardness of 80 or less, the golf ball excellent in durability is obtained. In addition, in case of a so-called spin golf ball which focuses on controllability, the cover composition preferably has a slab hardness of less than 50, and preferably has a slab hardness of 20 or more, more preferably 25 or more, and even more preferably 30 or more in Shore D hardness. If the cover composition has a slab hardness of less than 50 in Shore D hardness, the flight distance on driver shots can be improved by the core of the present invention, as well as the obtained golf ball readily stops on the green due to the high spin rate on approach shots. Further, if the cover composition has a slab hardness of 20 or more, the abrasion resistance becomes better. In case of a plurality of cover layers, the slab hardness of the cover composition constituting each layer may be identical to or different from each other, as long as the slab hardness of each layer falls within the above range.

The method for molding the cover of the golf ball of the present invention, for example, includes a method which comprises molding the cover composition into a hollow-shell, covering the core with a plurality of the hollow-shells and subjecting the core with a plurality of the hollow shells to the compression molding (preferably a method which comprises molding the cover composition into a half hollow-shell, covering the core with two of the half hollow-shells, and subjecting the core with two of the half hollow-shells to the compression molding); and a method which comprises injection molding the cover composition directly onto the core.

When molding the cover in the compression molding method, molding of the half shell may be conducted by either a compression molding method or an injection molding method, but the compression molding method is preferred. The compression molding of the cover composition into the half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of the method for molding the cover using half shells include a method of covering the core with two of the half shells and then subjecting the core with two of the half shells to the compression molding. The compression molding of the half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In case of injection molding the cover composition into the cover, the cover composition extruded in a pellet form beforehand may be used for the injection molding, or the cover materials such as the base resin components and the pigment may be dry blended, followed by directly injection molding the blended material. It is preferred to use upper and lower molds having a hemispherical cavity and pimples for forming the cover, wherein a part of the pimples also serves as a retractable hold pin. When molding the cover by the injection molding, the hold pin is protruded to hold the core, and the cover composition is charged and then cooled to obtain the cover. For example, the molding of the cover may be conducted as follows: the cover composition heated to a temperature ranging from 200° C. to 250° C. is charged for 0.5 to 5 seconds into a mold held under a pressure of 9 MPa to 15 MPa, and after cooling for 10 to 60 seconds, the mold is opened.

When molding the cover, concave portions called "dimple" are usually formed on the surface of the cover. The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The thickness of the cover is preferably 4.0 mm or less, more preferably 3.0 mm or less, and even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate. In the case that the cover has a plurality of layers, it is preferred that the total thickness of the cover layers falls within the above range.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

[Golf Ball]

The golf ball construction of the present invention is not particularly limited, as long as the golf ball comprises a spherical core and at least one cover covering the spherical core. FIG. 1 is a partially cutaway sectional view showing a golf ball 1 according to an embodiment of the present invention. The golf ball 1 comprises a spherical core 2, and a cover 3 covering the spherical core 2. A plurality of dimples 31 are formed on the surface of the cover. Other portion than the dimples 31 on the surface of the golf ball 1 is a land 32. The golf ball 1 is provided with a paint layer and a mark layer outside the cover 3, but these layers are not depicted.

The spherical core preferably has a single layered structure. Unlike the multi-layered structure, the spherical core of the single layered structure does not have energy loss at the interface of the multi-layered structure when being hit, and thus has a higher resilience. In addition, the cover has a structure of at least one layer, for example, a single layered structure, or a multi-layered structure of at least two layers. The golf ball of the present invention includes, for example, a two-piece golf ball comprising a spherical core and a single layered cover disposed around the spherical core; a multi-piece golf ball (including a three-piece golf ball) comprising a spherical core and at least two cover layers disposed around the spherical core; and a wound golf ball comprising a spherical core, a rubber thread layer which is formed around the spherical core, and a cover disposed over the rubber thread layer. The present invention can be suitably applied to any one of the above golf ball.

The golf ball of the present invention preferably has a diameter ranging from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball of the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.2 mm or more, and even more preferably 2.4 mm or more, and is preferably 4.0 mm or less, more preferably 3.5 mm or less, and even more preferably 3.4 mm or less. If the compression deformation amount is 2.0 mm or more, the golf ball does not become excessively hard, and thus the shot feeling thereof becomes better. On the other hand, if the compression deformation amount is 4.0 mm or less, the resilience of the golf ball becomes higher.

EXAMPLES

Next, the present invention will be described in detail by way of examples. However, the present invention is not limited to the examples described below.

Various changes and modifications without departing from the spirit of the present invention are included in the scope of the present invention.

[Evaluation Methods]

(1) Compression Deformation Amount

A compression deformation amount of the core or golf ball (a shrinking amount of the core or golf ball along the compression direction), when applying a load from an initial load of 98 N to a final load of 1275 N to the core or golf ball, was measured.

(2) Core Hardness Distribution (Shore C Hardness)

A type P1 auto loading durometer manufactured by Kobunshi Keiki Co., Ltd., provided with a Shore C type spring hardness tester was used to measure the hardness of the core. The Shore C hardness measured at the surface of the core was adopted as the surface hardness of the core. In addition, the core was cut into two hemispheres to obtain a cut plane, and the hardness at the central point of the cut plane and the hardness at predetermined distances from the central point of the cut plane were measured. It is noted that the hardness of the core was measured at four points at predetermined distances from the central point of the core cut plane, and the average value thereof was adopted as the hardness of the core at the predetermined distance.

(3) Coefficient of Restitution

A metal cylindrical object with a mass of 198.4 g was allowed to collide with each core or golf ball at a speed of 40 m/sec, and the speeds of the cylindrical object and the core or golf ball before and after the collision were measured. Based on these speeds and the mass of each object, the coefficient of restitution of each core or golf ball was calculated. The measurement was conducted using twelve samples for each core or golf ball, and the average value thereof was adopted as the coefficient of restitution for that core or golf ball. It is noted that the coefficient of restitution in Tables 1 to 4 is shown as a difference from the coefficient of restitution of the golf ball No. 1.

(4) Slab hardness (Shore D hardness)

Sheets with a thickness of about 2 mm were produced by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(5) Flight Distance on Driver Shots

A W #1 driver provided with a metal head (XXIO S, loft angel: 11°, available from Dunlop Sports Limited) was installed on a swing robot M/C available from Golf Laboratories, Inc. The golf ball was hit at a head speed of 40 m/sec, and the flight distance (the distance from the launch point to the stop point) thereof was measured. The measurement was conducted twelve times for each golf ball, and the average value thereof was adopted as the measurement value for that golf ball. It is noted that the flight distance of each golf ball is shown as a difference from the flight distance of the golf ball No. 1 (flight distance difference=flight distance of each golf ball - flight distance of golf ball No. 1).

(6) Durability

A W #1 driver provided with a metal head (XXIO S, loft angel: 11°, available from Dunlop Sports Limited) was installed on a swing robot M/C available from Golf Laboratories, Inc. The golf ball was hit repeatedly at a head speed of 45 m/sec until a crack occurred, and the hitting times when the crack occurred were counted. The measurement was conducted using twelve samples for each golf ball, and the average value thereof was adopted as the hitting times for that golf ball. It is noted that the difference between the hitting times of each golf ball and the hitting times of the golf ball No. 1 (hitting times difference=hitting times of each golf ball–hitting times of golf ball No. 1) was calculated, and the durability was evaluated according to the following standard.

Evaluation Standard

G (Good): The hitting times difference is 0 or more.
P (Poor): The hitting times difference is less than 0.

[Production of Golf Ball]

(1) Production of Core

The rubber compositions having the formulations shown in Tables 1 to 4 were kneaded with a kneading roll, and heat pressed in upper and lower molds, each having a hemispherical cavity, at 150° C. for 20 minutes to obtain spherical cores having a diameter of 39.8 mm. It is noted that barium sulfate was added in an appropriate amount such that the obtained golf balls have a mass of 45.4 g.

TABLE 1

|  |  | Golf ball No. | | | |
|---|---|---|---|---|---|
|  |  | 1 | 2 | 3 | 4 |
| Core rubber composition | BR730 | 100 | 100 | 100 | 100 |
|  | ZN-DA90S | 27 | 28 | 28 | 31 |
|  | Zinc oxide | 5.0 | 3.6 | 4.0 | 5.3 |
|  | PBDS | 0.3 | 0.3 | 0.3 | 0.3 |
|  | Dicumyl peroxide | 0.8 | 0.8 | 0.8 | 0.8 |
|  | Barium sulfate | *1) | *1) | *1) | *1) |
|  | Oleic acid (C18:1) cis-9 (9) | — | 3.0 | 5.0 | 10.0 |
|  | Zinc oleate (C18:1) | — | — | — | — |
|  | Erucic acid (C22:1, 9) | — | — | — | — |
|  | Myristoleic acid (C14:1, 9) | — | — | — | — |
|  | Undecylenic acid (C11:1) (1) | — | — | — | — |
|  | Zinc ricinoleate (C18:1, 9) | — | — | — | — |
|  | (d)/(b) | 0.00 | 0.04 | 0.07 | 0.13 |
| Hardness distribution (Shore C) | Center hardness H0 of core | 53.8 | 51.8 | 52.3 | 53.3 |
|  | Hardness H12.5 at 12.5% point | 60.2 | 58.0 | 58.5 | 59.5 |
|  | Hardness H25 at 25.0% point | 62.7 | 61.0 | 61.5 | 62.5 |
|  | Hardness H37.5 at 37.5% point | 63.3 | 61.4 | 62.4 | 62.9 |
|  | Hardness H50 at 50.0% point | 63.5 | 62.3 | 62.8 | 62.3 |
|  | Hardness H62.5 at 62.5% point | 66.9 | 68.2 | 66.7 | 65.2 |
|  | Hardness H75 at 75.0% point | 73.3 | 73.5 | 72.5 | 69.5 |
|  | Surface hardness Hs of core | 80.0 | 78.0 | 76.0 | 71.0 |
|  | Hs − H0 | 26.2 | 26.2 | 23.7 | 17.7 |
|  | D3 = H25 − H0 | 8.9 | 9.2 | 9.2 | 9.2 |
|  | D4 = H50 − H25 | 0.8 | 1.3 | 1.3 | −0.2 |
|  | D5 = H75 − H50 | 9.8 | 11.2 | 9.7 | 7.2 |
|  | D1 = H75 − H0 | 19.5 | 21.7 | 20.2 | 16.2 |
|  | D2 = Hs − H75 | 6.7 | 4.5 | 3.5 | 1.5 |
|  | D2/D1 | 0.3 | 0.2 | 0.2 | 0.1 |
| Core | Compression deformation amount (mm) | 3.8 | 3.8 | 3.8 | 3.8 |
|  | Coefficient of restitution | 0.000 | 0.007 | 0.010 | 0.005 |
| Golf ball | Compression deformation amount (mm) | 3.3 | 3.3 | 3.3 | 3.3 |
|  | Coefficient of restitution | Standard | 0.007 | 0.010 | 0.005 |
|  | Flight distance on driver shots (yd) | Standard | 1.2 | 1.7 | 1.0 |
|  | Durability | G | G | G | G |

*1) Appropriate amount

TABLE 2

|  |  | Golf ball No. | | | | | |
|---|---|---|---|---|---|---|---|
|  |  | 5 | 6 | 7 | 8 | 9 | 10 |
| Core rubber composition | BR730 | 100 | 100 | 100 | 100 | 100 | 100 |
|  | ZN-DA90S | 28 | 28 | 31 | 28 | 28 | 28 |
|  | Zinc oxide | 3.2 | 3.3 | 3.8 | 3.6 | 4.0 | 5.0 |
|  | PBDS | 0.63 | 0.63 | 0.63 | 0.63 | 0.63 | 0.63 |
|  | Dicumyl peroxide | 0.8 | 0.8 | 0.8 | 0.8 | 0.8 | 0.8 |
|  | Barium sulfate | *1) | *1) | *1) | *1) | *1) | *1) |
|  | Oleic acid (C18:1) cis-9 (9) | — | — | — | — | — | — |
|  | Zinc oleate (C18:1) | 3.3 | 5.6 | 11.1 | — | — | — |

TABLE 2-continued

|  |  | Golf ball No. | | | | | |
|---|---|---|---|---|---|---|---|
|  |  | 5 | 6 | 7 | 8 | 9 | 10 |
|  | Erucic acid (C22:1,9) | — | — | — | 3.6 | 6.0 | 12.0 |
|  | Myristoleic acid (C14:1,9) | — | — | — | — | — | — |
|  | Undecylenic acid (C11:1) (1) | — | — | — | — | — | — |
|  | Zinc ricinoleate (C18:1,9) | — | — | — | — | — | — |
|  | (d)/(b) | 0.04 | 0.07 | 0.13 | 0.04 | 0.07 | 0.15 |
| Hardness distribution (Shore C) | Center hardness H0 of core | 49.8 | 51.3 | 54.3 | 51.8 | 53.1 | 54.5 |
|  | Hardness H12.5 at 12.5% point | 57.0 | 57.5 | 59.5 | 58.2 | 59.0 | 60.0 |
|  | Hardness H25 at 25.0% point | 60.9 | 61.4 | 62.4 | 61.1 | 62.0 | 63.0 |
|  | Hardness H37.5 at 37.5% point | 62.4 | 63.4 | 63.9 | 61.9 | 62.7 | 63.2 |
|  | Hardness H50 at 50.0% point | 63.3 | 63.8 | 63.3 | 61.8 | 63.0 | 62.5 |
|  | Hardness H62.5 at 62.5% point | 68.3 | 66.8 | 65.3 | 67.7 | 66.4 | 64.9 |
|  | Hardness H75 at 75.0% point | 73.6 | 73.0 | 70.0 | 73.3 | 71.7 | 69.2 |
|  | Surface hardness Hs of core | 79.0 | 76.5 | 72.0 | 77.8 | 75.0 | 70.5 |
|  | Hs − H0 | 29.2 | 25.2 | 17.7 | 26.0 | 21.9 | 16.0 |
|  | D3 = H25 − H0 | 11.1 | 10.1 | 8.1 | 9.3 | 8.9 | 8.5 |
|  | D4 = H50 − H25 | 2.4 | 2.4 | 0.9 | 0.7 | 1.0 | −0.5 |
|  | D5 = H75 − H50 | 10.3 | 9.2 | 6.7 | 11.5 | 8.7 | 6.7 |
|  | D1 = H75 − H0 | 23.8 | 21.7 | 15.7 | 21.5 | 18.6 | 14.7 |
|  | D2 = Hs − H75 | 5.4 | 3.5 | 2.0 | 4.5 | 3.3 | 1.3 |
|  | D2/D1 | 0.2 | 0.2 | 0.1 | 0.2 | 0.2 | 0.1 |
| Core | Compression deformation amount (mm) | 3.8 | 3.8 | 3.8 | 3.8 | 3.8 | 3.8 |
|  | Coefficient of restitution | 0.007 | 0.010 | 0.005 | 0.010 | 0.013 | 0.008 |
| Golf ball | Compression deformation amount (mm) | 3.3 | 3.3 | 3.3 | 3.3 | 3.3 | 3.3 |
|  | Coefficient of restitution | 0.007 | 0.010 | 0.005 | 0.010 | 0.013 | 0.008 |
|  | Flight distance on driver shots (yd) | 1.2 | 1.7 | 1.0 | 1.7 | 2.2 | 1.4 |
|  | Durability | G | G | G | G | G | G |

*1) Appropriate amount

TABLE 3

|  |  | Golf ball No. | | | | | | |
|---|---|---|---|---|---|---|---|---|
|  |  | 11 | 12 | 13 | 14 | 15 | 16 | 17 |
| Core rubber composition | BR730 | 100 | 100 | 100 | 100 | 100 | 100 | 100 |
|  | ZN-DA90S | 28 | 28 | 28 | 28 | 28 | 28 | 28 |
|  | Zinc oxide | 3.6 | 4.0 | 5.0 | 4.4 | 5.9 | 5.0 | 5.0 |
|  | PBDS | 0.63 | 0.63 | 0.63 | 0.63 | 0.63 | 0.63 | 0.63 |
|  | Dicumyl peroxide | 0.8 | 0.8 | 0.8 | 0.8 | 0.8 | 0.8 | 0.8 |
|  | Barium sulfate | *1) | *1) | *1) | *1) | *1) | *1) | *1) |
|  | Oleic acid (C18:1)cis-9 (9) | — | — | — | — | — | — | — |
|  | Zinc oleate (C18:1) | — | — | — | — | — | — | — |
|  | Erucic acid (C22:1,9) | — | — | — | — | — | — | — |
|  | Myristoleic acid (C14:1,9) | 2.4 | 4.0 | 8.0 | — | — | — | — |
|  | Undecylenic acid (C11:1) (1) | — | — | — | 3.3 | 6.5 | — | — |
|  | Zinc ricinoleate (C18:1,9) | — | — | — | — | — | 5.8 | 11.7 |
|  | (d)/(b) | 0.04 | 0.07 | 0.15 | 0.07 | 0.15 | 0.07 | 0.15 |
| Hardness distribution (Shore C) | Center hardness H0 of core | 53.8 | 53.3 | 54.8 | 51.3 | 52.3 | 52.1 | 52.3 |
|  | Hardness H12.5 at 12.5% point | 58.5 | 58.0 | 59.3 | 58.0 | 59.0 | 58.3 | 58.5 |
|  | Hardness H25 at 25.0% point | 61.5 | 61.0 | 62.0 | 61.0 | 62.0 | 61.2 | 62.4 |
|  | Hardness H37.5 at 37.5% point | 61.5 | 62.5 | 63.0 | 62.1 | 62.6 | 62.3 | 63.0 |
|  | Hardness H50 at 50.0% point | 63.3 | 63.8 | 63.3 | 62.3 | 61.8 | 62.4 | 62.4 |
|  | Hardness H62.5 at 62.5% point | 68.3 | 67.7 | 66.2 | 66.2 | 64.7 | 66.0 | 64.8 |
|  | Hardness H75 at 75.0% point | 73.5 | 72.6 | 70.3 | 72.5 | 69.5 | 72.4 | 69.2 |
|  | Surface hardness Hs of core | 78.5 | 76.8 | 72.2 | 76.5 | 71.5 | 76.1 | 71.1 |
|  | Hs − H0 | 24.7 | 23.5 | 17.4 | 25.2 | 19.2 | 24.0 | 18.8 |
|  | D3 = H25 − H0 | 7.7 | 7.7 | 7.2 | 9.7 | 9.7 | 9.1 | 10.1 |
|  | D4 = H50 − H25 | 1.8 | 2.8 | 1.3 | 1.3 | −0.2 | 1.2 | 0.0 |
|  | D5 = H75 − H50 | 10.2 | 8.8 | 7.0 | 10.2 | 7.7 | 10.0 | 6.8 |
|  | D1 = H75 − H0 | 19.7 | 19.3 | 15.5 | 21.2 | 17.2 | 20.3 | 16.9 |
|  | D2 = Hs − H75 | 5.0 | 4.2 | 1.9 | 4.0 | 2.0 | 3.7 | 1.9 |
|  | D2/D1 | 0.3 | 0.2 | 0.1 | 0.2 | 0.1 | 0.2 | 0.1 |
| Core | Compression deformation amount (mm) | 3.8 | 3.8 | 3.8 | 3.8 | 3.8 | 3.8 | 3.8 |
|  | Coefficient of restitution | 0.003 | 0.005 | 0.006 | 0.003 | 0.003 | 0.004 | 0.006 |
| Golf ball | Compression deformation amount (mm) | 3.3 | 3.3 | 3.3 | 3.3 | 3.3 | 3.3 | 3.3 |
|  | Coefficient of restitution | 0.003 | 0.005 | 0.006 | 0.003 | 0.003 | 0.004 | 0.006 |
|  | Flight distance on driver shots (yd) | 0.5 | 0.9 | 0.9 | 0.5 | 0.5 | 1.5 | 2.0 |
|  | Durability | G | G | G | G | G | G | G |

*1) Appropriate amount

TABLE 4

|  |  | Golf ball No. | | | |
| --- | --- | --- | --- | --- | --- |
|  |  | 18 | 19 | 20 | 21 |
| Core rubber composition | BR730 | 100 | 100 | 100 | 100 |
|  | ZN-DA90S | 28 | 28 | 28 | 28 |
|  | Zinc oxide | 4.0 | 4.9 | 3.3 | 3.5 |
|  | PBDS | 0.63 | 0.63 | 0.63 | 0.63 |
|  | Dicumyl peroxide | 0.8 | 0.8 | 0.8 | 0.8 |
|  | Barium sulfate | *1) | *1) | *1) | *1) |
|  | Stearic acid (C18:0) | 5.0 | 10.1 | — | — |
|  | Zinc stearate C18:0) | — | — | 5.6 | 11.2 |
|  | Linoleic acid (C18:2) | — | — | — | — |
|  | (d)/(b) | 0.00 | 0.00 | 0.00 | 0.00 |
| Hardness distribution (Shore C) | Center hardness H0 of core | 50.8 | 48.8 | 50.8 | 48.6 |
|  | Hardness H12.5 at 12.5% point | 57.7 | 56.2 | 57.7 | 56.0 |
|  | Hardness H25 at 25.0% point | 60.7 | 59.7 | 60.7 | 59.4 |
|  | Hardness H37.5 at 37.5% point | 61.3 | 60.8 | 61.3 | 60.7 |
|  | Hardness H50 at 50.0% point | 62.5 | 62.0 | 62.5 | 62.1 |
|  | Hardness H62.5 at 62.5% point | 66.9 | 66.4 | 66.9 | 66.6 |
|  | Hardness H75 at 75.0% point | 73.3 | 73.0 | 73.3 | 73.1 |
|  | Surface hardness Hs of core | 81.0 | 81.5 | 81.0 | 82.0 |
|  | Hs − H0 | 30.2 | 32.7 | 30.2 | 33.4 |
|  | D3 = H25 − H0 | 9.9 | 10.9 | 9.9 | 10.8 |
|  | D4 = H50 − H25 | 1.8 | 2.3 | 1.8 | 2.7 |
|  | D5 = H75 − H50 | 10.8 | 11.0 | 10.8 | 11.0 |
|  | D1 = H75 − H0 | 22.5 | 24.2 | 22.5 | 24.5 |
|  | D2 = Hs − H75 | 7.7 | 8.5 | 7.7 | 8.9 |
|  | D2/D1 | 0.3 | 0.4 | 0.3 | 0.4 |
| Core | Compression deformation amount (mm) | 3.8 | 3.8 | 3.8 | 3.8 |
|  | Coefficient of restitution | 0.002 | 0.001 | 0.002 | 0.001 |
| Golf ball | Compression deformation amount (mm) | 3.3 | 3.3 | 3.3 | 3.3 |
|  | Coefficient of restitution | 0.002 | 0.001 | 0.002 | 0.001 |
|  | Flight distance on driver shots (yd) | 0.2 | 0.3 | 0.2 | 0.3 |
|  | Durability | G | G | G | G |

*1) Appropriate amount

The materials used in Tables 1 to 4 are shown below.

BR730: high-cis polybutadiene rubber (amount of cis-1,4 bond=96 mass %, amount of 1,2-vinyl bond=1.3 mass %, Moony viscosity (ML$_{1+4}$ (100° C.)=55, molecular weight distribution (Mw/Mn)=3) available from JSR Corporation ZN-DA90S: zinc acrylate (containing zinc stearate in an amount of 10 mass %) available from Nisshoku Techno Fine Chemical Co., Ltd.

Dicumyl peroxide: available from Tokyo Chemical Industry Co., Ltd.

Zinc oxide: "Ginrei R" available from Toho Zinc Co., Ltd.

PBDS: bis(pentabromophenyl)disulfide available from Kawaguchi Chemical Industry Co., Ltd.

Barium sulfate: "Barium sulfate BD" available from Sakai Chemical Industry Co., Ltd. Oleic acid: unsaturated fatty acid (C18, (9); in the chemical formula (2), $R^{11}$ has a carbon number of 8, $R^{12}$ has a carbon number of 7, carbon atom number of $R^{11}$/carbon atom number of $R^{12}$=1.1) available from Tokyo Chemical Industry Co., Ltd.

Zinc oleate: metal salt of unsaturated fatty acid (C18, (9); in the chemical formula (2), $R^{11}$ has a carbon number of 8, $R^{12}$ has a carbon number of 7, carbon atom number of $R^{11}$/carbon atom number of $R^{12}$=1.1) available from Mitsuwa Chemicals Co., Ltd.

Myristoleic acid: unsaturated fatty acid (C14, (9); in the chemical formula (2), $R^{11}$ has a carbon number of 4, $R^{12}$ has a carbon number of 7, carbon atom number of $R^{11}$/carbon atom number of $R^{12}$=0.6) available from Tokyo Chemical Industry Co., Ltd.

Erucic acid: unsaturated fatty acid (C22, (13); in the chemical formula (2), $R^{11}$ has a carbon number of 8, $R^{12}$ has a carbon number of 11, carbon atom number of $R^{11}$/carbon atom number of $R^{12}$=0.7) available from Tokyo Chemical Industry Co., Ltd.

10-Undecylenic acid: unsaturated fatty acid (C11, (10); in the chemical formula (2), $R^{11}$ has a carbon atom number of 0, $R^{12}$ has a carbon atom number of 8) available from Nitto Chemical Co. Ltd.

Linoleic acid: unsaturated fatty acid (C18, (9); in the chemical formula (3), $R^{21}$ has a carbon atom number of 5, $R^{22}$ has a carbon atom number of 1, $R^{23}$ has a carbon atom number of 7, carbon atom number of $R^{21}$/carbon atom number of $R^{23}$=0.7) available from Tokyo Chemical Industry Co., Ltd.

Zinc ricinoleate: metal salt of unsaturated fatty acid (C18, (9); in the chemical formula (2), $R^{11}$ has a carbon atom number of 8 (one OH at the third carbon from carbon-carbon double bond), $R^{12}$ has a carbon atom number of 7, carbon atom number of $R^{11}$/carbon atom number of $R^{12}$=1.1) available from Nitto Chemical Co. Ltd.

Stearic acid: saturated fatty acid available from Tokyo Chemical Industry Co., Ltd.

Zinc stearate: metal salt of saturated fatty acid available from Nihon Joryu Kogyo Co., Ltd.

(2) Production of Cover and Production of Golf Ball

Cover materials having the formulation shown in Table 5 were extruded with a twin-screw kneading extruder to prepare a cover composition in a pellet form. The extruding conditions of the cover composition were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above to produce a golf ball comprising a spherical core and a cover covering the spherical core.

TABLE 5

| Cover material | Parts by mass |
| --- | --- |
| Himilan 1605 | 50 |
| Himilan 1706 | 50 |
| Titanium oxide | 4 |

The materials used in Table 5 are shown below.

Himilan 1605: sodium ion neutralized ethylene-methacrylic acid copolymer ionomer resin available from Du Pont-Mitsui Polychemicals Co., Ltd.

Himilan 1706: zinc ion neutralized ethylene-methacrylic acid copolymer ionomer resin available from Du Pont-Mitsui Polychemicals Co., Ltd.

Titanium oxide: A220 available from Ishihara Sangyo Kaisha, Ltd.

The inventive golf ball comprises a spherical core and at least one cover covering the spherical core, wherein a hardness difference D1 (H75-H0) between a hardness H75 at a point located at a distance of 75% of a radius from a center of the spherical core and a center hardness H0 of the spherical core is 10 or more and 27 or less in Shore C hardness, and a hardness difference D2 (Hs-H75) between a surface hardness Hs of the spherical core and the hardness H75 at the point located at the distance of 75% of the radius from the center of the spherical core is 0 or more and 6.5 or less in Shore C hardness. As shown in Tables 1-4, the spherical cores of the inventive golf balls have a high resilience, and these inventive golf balls show an excellent flight performance.

The golf ball according to the present invention has an excellent flight performance.

This application is based on Japanese patent application No. 2016-213479 filed on Oct. 31, 2016, the content of which is hereby incorporated by reference.

The invention claimed is:

1. A golf ball comprising a spherical core and at least one cover covering the spherical core, wherein
a hardness difference D1 (H75-H0) between a hardness H75 at a point located at a distance of 75% of a radius from a center of the spherical core and a center hardness H0 of the spherical core is 10 or more and 27 or less in Shore C hardness,
a hardness difference D2 (Hs-H75) between a surface hardness Hs of the spherical core and the hardness H75 at the point located at the distance of 75% of the radius from the center of the spherical core is 0 or more and 6.5 or less in Shore C hardness,
a hardness difference D5 (H75-H50) between the hardness H75 at the point located at the distance of 75% of the radius from the center of the spherical core and a hardness H50 at a point located at a distance of 50% of the radius from the center of the spherical core is 8 or more in Shore C hardness, and
a hardness difference D4 (H50-H25) between the hardness H50 at the point located at the distance of 50% of the radius from the center of the spherical core and a hardness H25 at a point located at a distance of 25% of the radius from the center of the spherical core is -3 or more and 2 or less in Shore C hardness.

2. The golf ball according to claim 1, wherein a ratio (D2/D1) of the hardness difference D2 to the hardness difference D1 is 0.05 or more and 0.25 or less, and the hardness difference D2 (Hs-H75) is 0.5 or more and 5.5 or less in Shore C hardness.

3. The golf ball according to claim 1, wherein a hardness difference D3 (H25-H0) between the hardness H25 at the point located at the distance of 25% of the radius from the center of the spherical core and the center hardness H0 of the spherical core is 7 or more in Shore C hardness.

4. The golf ball according to claim 1, wherein the hardness difference D5 (H75-H50) between the hardness H75 at the point located at the distance of 75% of the radius from the center of the spherical core and the hardness H50 at the point located at the distance of 50% of the radius from the center of the spherical core is 8.7 or more and 13 or less in Shore C hardness.

5. The golf ball according to claim 1, wherein the spherical core is formed from a rubber composition containing:
(a) a base rubber,
(b) an α,β-unsaturated carboxylic acid having 3 to 8 carbon atoms and/or a metal salt thereof as a co-crosslinking agent,
(c) a crosslinking initiator, and
(d) an unsaturated fatty acid and/or a metal salt thereof excluding an α,β-unsaturated carboxylic acid having 3 to 8 carbon atoms and/or a metal salt thereof.

6. The golf ball according to claim 5, wherein (d) the unsaturated fatty acid and/or the metal salt thereof is an unsaturated fatty acid having 4 to 33 carbon atoms and/or a metal salt thereof.

7. The golf ball according to claim 5, wherein (d) the unsaturated fatty acid and/or the metal salt thereof is an unsaturated fatty acid having one or two carbon-carbon double bonds and/or a metal salt thereof.

8. The golf ball according to claim 5, wherein (d) the unsaturated fatty acid and/or the metal salt thereof is a linear unsaturated fatty acid and/or a metal salt thereof.

9. The golf ball according to claim 6, wherein (d) the unsaturated fatty acid and/or the metal salt thereof is an unsaturated fatty acid represented by a chemical formula (1) and/or a metal salt thereof,

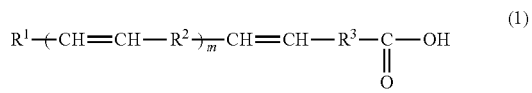

wherein in the chemical formula (1),
$R^1$ represents a hydrogen atom or an alkyl group having 1 to 25 carbon atoms and optionally having a substituent,
$R^2$ represents an alkylene group having 1 to 25 carbon atoms and optionally having a substituent,
$R^3$ represents an alkylene group having 2 to 25 carbon atoms and optionally having a substituent, and
m represents a natural number ranging from 0 to 5, and when m ranges from 2 to 5, multiple $R^2$ may be identical to or different from each other.

10. The golf ball according to claim 5, wherein the rubber composition contains (d) the unsaturated fatty acid and/or the metal salt thereof in an amount ranging from 1 part by mass to 35 parts by mass with respect to 100 parts by mass of (a) the base rubber.

11. The golf ball according to claim 5, wherein the rubber composition has a neutralization degree of 100 mole % or more and 300 mole % or less.

12. The golf ball according to claim 5, wherein the rubber composition further contains (g) an organic sulfur compound in an amount of 0.05 parts by mass to 5 parts by mass with respect to 100 parts by mass of (a) the base rubber, wherein (g) the organic sulfur compound is at least one compound selected from the group consisting of thiophenols, diphenyldisulfides, thionaphthols, thiuramdisulfides, and metal salts thereof.

13. The golf ball according to claim 6, wherein the rubber composition contains (b) the α,β-unsaturated carboxylic acid having 3 to 8 carbon atoms and/or the metal salt thereof in an amount ranging from 15 parts by mass to 50 parts by mass with respect to 100 parts by mass of (a) the base rubber.

14. The golf ball according to claim 9, wherein the unsaturated fatty acid represented by the chemical formula (1) is an unsaturated fatty acid represented by a chemical formula (2) or a chemical formula (3),

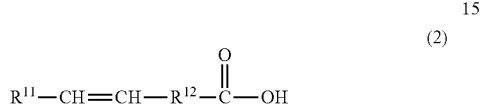

(2)

wherein in the chemical formula (2),
$R^{11}$ represents a hydrogen atom or an alkyl group having 1 to 25 carbon atoms and optionally having a substituent, and
$R^{12}$ represents an alkylene group having 2 to 25 carbon atoms and optionally having a substituent;

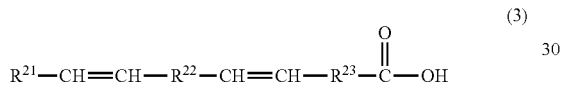

(3)

wherein in the chemical formula (3),
$R^{21}$ represents a hydrogen atom or an alkyl group having 1 to 25 carbon atoms and optionally having a substituent,
$R^{22}$ represents an alkylene group having 1 to 25 carbon atoms and optionally having a substituent, and
$R^{23}$ represents an alkylene group having 2 to 25 carbon atoms and optionally having a substituent.

15. The golf ball according to claim 3, wherein the spherical core has a structure represented by a chemical formula (4),

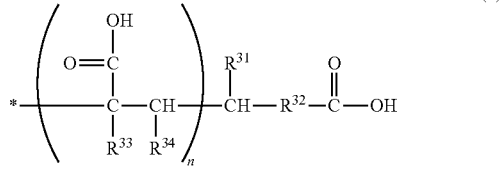

(4)

wherein in the chemical formula (4),
$R^{31}$ represents a hydrogen atom or an alkyl group having 1 to 25 carbon atoms and optionally being substituted with a functional group,
$R^{32}$ represents an alkylene group having 2 to 25 carbon atoms and optionally being substituted with a functional group,
$R^{33}$ represents a hydrogen atom or an alkyl group having 1 to 5 carbon atoms,
$R^{34}$ represents a hydrogen atom, a carboxyl group or an alkyl group having 1 to 5 carbon atoms,
* represents a location bonding to a carbon atom in (a) the base rubber, and n represents a natural number of 1 or more, and when n is 2 or more, multiple $R^{33}$ and $R^{34}$ may be identical to or different from each other.

16. The golf ball according to claim 1, wherein the spherical core is formed from a rubber composition consisting of:
(a) a base rubber,
(b) an α,β-unsaturated carboxylic acid having 3 to 8 carbon atoms and/or a metal salt thereof as a co-crosslinking agent,
(c) at least one crosslinking initiator selected from the group consisting of dicumyl peroxide, 1,1-bis(t-butylperoxy)-3,3,5-trimethylcyclohexane, 2,5-dimethyl-2,5-di(t-butylperoxy)hexane, and di-t-butylperoxide,
(d) an unsaturated fatty acid and/or a metal salt thereof excluding an 60,62-unsaturated carboxylic acid having 3 to 8 carbon atoms and/or a metal salt thereof, and
optionally, at least one component selected from the group consisting of
(e) a saturated fatty acid and/or a metal salt thereof;
(f) at least one metal compound selected from the group consisting of a metal hydroxide, a metal oxide and a metal carbonate;
(g) an organic sulfur compound;
a pigment;
a filler;
an antioxidant;
a peptizing agent; and
a softening agent.

17. The golf ball according to claim 1, wherein the hardness difference D2 (Hs–H75) is 1.0 or more and 6.5 or less in Shore C hardness.

18. The golf ball according to claim 1, wherein a ratio (D2/D1) of the hardness difference D2 to the hardness difference D1 is 0.1 or more and 0.25 or less.

19. The golf ball according to claim 1, wherein the hardness difference D5 (H75–H50) is 8.7 or more in Shore C hardness.

20. A golf ball comprising a spherical core and at least one cover covering the spherical core, wherein
a hardness difference D1 (H75–H0) between a hardness H75 at a point located at a distance of 75% of a radius from a center of the spherical core and a center hardness H0 of the spherical core is 10 or more and 27 or less in Shore C hardness,
a hardness difference D2 (Hs<H75) between a surface hardness Hs of the spherical core and the hardness H75 at the point located at the distance of 75% of the radius from the center of the spherical core is 0 or more and 6.5 or less in Shore C hardness,
a hardness difference D5 (H75–H50) between the hardness H75 at the point located at the distance of 75% of the radius from the center of the spherical core and a hardness H50 at a point located at a distance of 50% of the radius from the center of the spherical core is 6 or more 8 or more in Shore C hardness,
a hardness difference D4 (H50–H25) between the hardness H50 at the point located at the distance of 50% of the radius from the center of the spherical core and a hardness H25 at a point located at a distance of 25% of the radius from the center of the spherical core is −3 or more and 2 or less in Shore C hardness, and the spherical core is formed from a rubber composition consisting of:
(a) a base rubber,
(b) an α,β-unsaturated carboxylic acid having 3 to 8 carbon atoms and/or a metal salt thereof as a co-crosslinking agent,
(c) at least one crosslinking initiator selected from the group consisting of dicumyl peroxide, 1,1-bis(t-butylperoxy)-3,3,5-trimethylcyclohexane, 2,5-dimethyl-2,5-di(t-butylperoxy)hexane, and di-t-butylperoxide,
(d) an unsaturated fatty acid and/or a metal salt thereof excluding an α,62 -unsaturated carboxylic acid having 3 to 8 carbon atoms and/or a metal salt thereof, and optionally at least one component selected from the group consisting of
(e) a saturated fatty acid and/or a metal salt thereof;
(f) at least one metal compound selected from the group consisting of a metal hydroxide, a metal oxide and a metal carbonate;
(g) an organic sulfur compound;
a pigment;
a filler;
an antioxidant;
a peptizing agent; and
a softening agent.

21. The golf ball according to claim 20, wherein the hardness difference D5 (H75−H50) is 8.7 or more in Shore C hardness.

* * * * *